US011881197B2

(12) United States Patent
Palmer

(10) Patent No.: US 11,881,197 B2
(45) Date of Patent: Jan. 23, 2024

(54) DUAL KEYBOARD SUSTAIN PEDAL STABILIZER

(71) Applicant: Fred Palmer, Detroit, MI (US)

(72) Inventor: Fred Palmer, Detroit, MI (US)

( * ) Notice: Subject to any disclaimer, the term of this patent is extended or adjusted under 35 U.S.C. 154(b) by 0 days.

(21) Appl. No.: 17/978,303

(22) Filed: Nov. 1, 2022

(65) Prior Publication Data

US 2023/0047082 A1 Feb. 16, 2023

Related U.S. Application Data

(63) Continuation-in-part of application No. 16/998,490, filed on Aug. 20, 2020, now Pat. No. 11,493,947, and a continuation-in-part of application No. 16/270,428, filed on Feb. 7, 2019, now Pat. No. 10,755,680, and a continuation-in-part of application No. 29/637,287, filed on Feb. 15, 2018, now Pat. No. Des. 880,578.

(51) Int. Cl.
*G10H 1/00* (2006.01)
*G10H 1/34* (2006.01)

(52) U.S. Cl.
CPC ....... *G10H 1/348* (2013.01); *G10H 2220/265* (2013.01)

(58) Field of Classification Search
CPC ... G10D 3/12; G10D 3/04; G10D 3/00; B23D 71/08
See application file for complete search history.

(56) References Cited

U.S. PATENT DOCUMENTS 5,075,906 A * 12/1991 Robbins ................. A47K 13/10 4/246.5
8,022,283 B1 * 9/2011 Williams, Jr. ........... G10C 3/00 84/423 R

* cited by examiner

*Primary Examiner* — Kimberly R Lockett
(74) *Attorney, Agent, or Firm* — Gerald R. Black, Esq.

(57) ABSTRACT

The dual keyboard sustain pedal stabilizer is designed for use with a pair of keyboard sustain foot pedals. The dual keyboard sustain pedal stabilizer comprises a stabilizer base, a first pedal-retention area in cooperative engagement with the stabilizer base, a second pedal-retention area in cooperative engagement with the stabilizer base, and an underside of the stabilizer base having a non-slip surface. The first and second pedal-retention areas each include retaining structures proximate to the stabilizer base. The retaining structures enable secure retention of the keyboard sustain foot pedals within the pedal retention area. The dual keyboard sustain pedal stabilizer provides stable footing for the musician on damp floors for both feet while providing a dual keyboard sustain pedal stabilizer that stabilizes either one or two keyboard sustain foot pedals. The dual keyboard sustain pedal stabilizer has no moving parts and is compatible with essentially any keyboard sustain foot pedal.

23 Claims, 16 Drawing Sheets

SECTION A–A

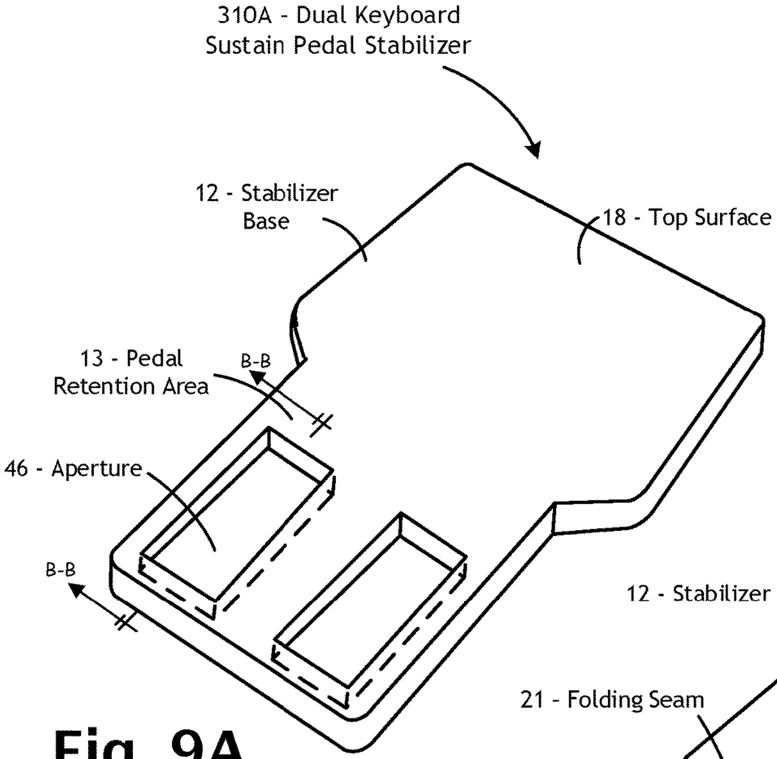
Fig. 9A
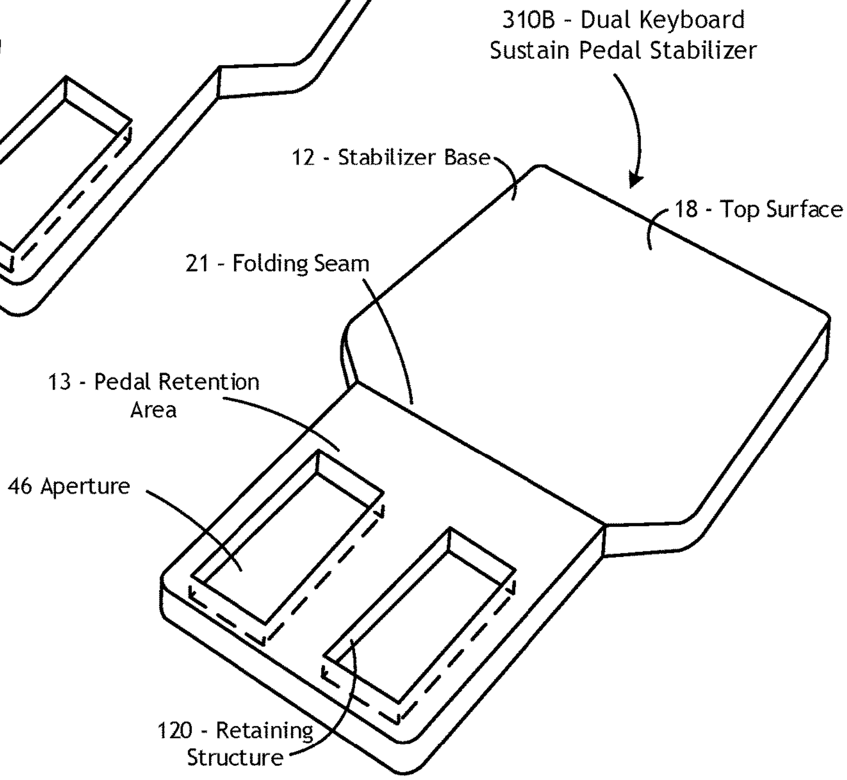
Fig. 9B
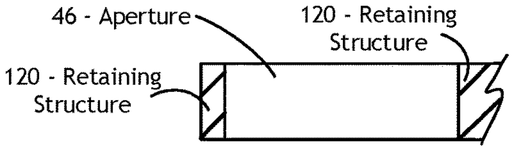
SECTION B–B

DUAL KEYBOARD SUSTAIN PEDAL STABILIZER

CROSS-REFERENCE TO RELATED APPLICATIONS

This Application is a continuation-in-part [related to] and claims priority to U.S. Ser. No. 16/998,490, entitled "Keyboard Sustain Pedal Stabilizer" (Palmer), filed on Aug. 20, 2020, (now U.S. patent Ser. No. 11/493,947); to U.S. Ser. No. 16/270,428, entitled "Keyboard Sustain Pedal Stabilizer" (Palmer), filed on Feb. 7, 2019 (now U.S. patent Ser. No. 10/755,680); and U.S. Provisional Application No. 62/631,671, entitled "Keyboard Sustain Pedal Stabilizer" (Palmer), filed on Feb. 17, 2018.

FIELD OF USE

The present invention relates to keyboard sustain foot pedals, and particularly to a keyboard sustain pedal stabilizer for use with a keyboard sustain foot pedal.

BACKGROUND OF THE INVENTION

Typically, musicians will try to prevent the keyboard sustain foot pedal from moving and sliding on the floor by placing a heavy object such as a brick behind the keyboard sustain foot pedal.

What is needed is a dual keyboard sustain pedal stabilizer that does not have any moving parts, has no connection to the keyboard stand, is easy to use, requires no set-up time, is compact and readily transportable, and is compatible with any keyboard sustain foot pedal.

The primary objective of the present invention is to provide a dual keyboard sustain pedal stabilizer that stabilizes either one or two keyboard sustain foot pedals.

Another objective of the present invention is to provide an attachable pedal cover comprised of a rubber-type pad with an anti-slip means for preventing slipping of the dual keyboard sustain pedal stabilizer engaging in a stable manner with the floor.

It is still yet another objective of the present invention to provide stable footing for the musician on damp floors for both feet while providing a dual keyboard sustain pedal stabilizer that stabilizes either one or two keyboard sustain foot pedals.

It is another objective of the present invention to provide a dual keyboard sustain pedal stabilizer for either one or two keyboard sustain foot pedals that is compatible with floors having varying textures and hardnesses.

SUMMARY OF THE INVENTION

The dual keyboard sustain pedal stabilizer of the present invention addresses these needs and objectives.

A hinge, as used herein, is a mechanical bearing that connects two solid objects, typically enabling rotation between the two solid objects. The two objects connected by the hinge rotate relative to each other about a fixed axis of rotation.

A recess, as used herein, is a compressed section in an object formed by compressing the section in such a manner as to form a crater of a predetermined shape. The compressed section is then surrounded by the perimeter of the retaining structure that is not compressed and an object having almost the predetermined shape may be securely retained within the recess.

Similarly, an aperture, as used herein, is a hollowed-out or open section within the retaining structure as an object forming the hollowed-out section is pressed through the retaining structure in such a manner as to form an aperture of a predetermined shape. The hollowed-out section is then surrounded by sidewalls and end walls of the retaining structure and an object having almost the predetermined shape may be securely retained within the aperture.

As used herein, a "keyboard" instrument includes any instrument equipped with a keyboard, a row of levers which are depressed by the fingers to generate music. The most common of these are the piano, organ, and various electronic keyboards, including synthesizers and digital pianos. Other keyboard instruments, which are struck idiophones operated by a keyboard, which are usually housed in bell towers or belfries of churches or municipal buildings. In its broadest sense, the term keyboard instrument is applied to any instrument equipped with a keyboard and thus may be used to refer to accordions, percussion instruments and many electronic instruments—such as by way of non-limiting example, a celesta, a harpsichord, a virginal, and a carillon, a Moog synthesizer, a spinet keyboard and an Ondes Martenot.

In one preferred embodiment the dual keyboard sustain pedal stabilizer has a first retaining structure of the first pedal-retention area abutted by a sidewall, a common sidewall, and an end wall in cooperative engagement with the stabilizer base.

The second retaining structure of the second pedal-retention area is also abutted by a sidewall, the same common sidewall, and an end wall in cooperative engagement with the stabilizer base.

The underside of the stabilizer base has a non-slip surface.

In another preferred embodiment the dual keyboard sustain pedal stabilizer has a first retaining structure of the first pedal-retention area compressed forming a recess or cavity, such that the perimeter of the first retaining structure that is not compressed forms the sidewalls and end wall to secure the first keyboard sustain foot pedal in place.

The second retaining structure of the second pedal-retention area is also compressed forming a recess or cavity, such that the perimeter of the second retaining structure that is not compressed forms the sidewalls and end wall to secure the second keyboard sustain foot pedal in place.

The underside of the stabilizer base has a non-slip surface.

Preferably, the dual keyboard sustain pedal stabilizer of the present invention does not connect to the keyboard instrument in any way. The dual keyboard sustain pedal stabilizer is compatible with any keyboard sustain pedal. The dual keyboard sustain pedal stabilizer may be made by a 3D printing process. In one preferred embodiment, the dual keyboard sustain pedal stabilizer is a black rigid polypropylene material, such as an oriented polyethylene terephthalate, or a simulated polypropylene material and preferably having a non-aggressive tread pattern.

For a complete understanding of the dual keyboard sustain pedal stabilizer of the present invention, reference is made to the accompanying drawings and description in which the presently preferred embodiments of the invention are shown by way of example. None of these drawings are to scale and are being presented to illustrate various preferred embodiments of the invention. The invention may be embodied in many forms without departing from spirit of essential characteristics thereof. It is expressly understood that the drawings are for purposes of illustration and description only and are not intended as a definition of the limits of the invention.

BRIEF DESCRIPTION OF THE DRAWINGS

FIG. 9A depicts an assembly view of but another preferred embodiment of the dual keyboard sustain pedal stabilizer of the present invention mounted within the pedal retention area of the retaining structure, where the pair of keyboard sustain foot pedals are mounted side-by-side and retained within a retaining structure, the retaining structure being an aperture, as shown in SECTION "B-B".

FIG. 9B depicts an assembly view of but yet another preferred embodiment of the dual keyboard sustain pedal stabilizer of the present invention mounted within the pedal retention area of the retaining structure, where the pair of keyboard sustain foot pedals are mounted side-by-side and retained within a retaining structure, the retaining structure being an aperture, the dual keyboard sustain pedal stabilizer including a folding seam cooperatively engaging with a hinge enable the stabilizer to be folded into a more compact position ready for transport.

DETAILED DESCRIPTION OF THE INVENTION

Figure 1A:
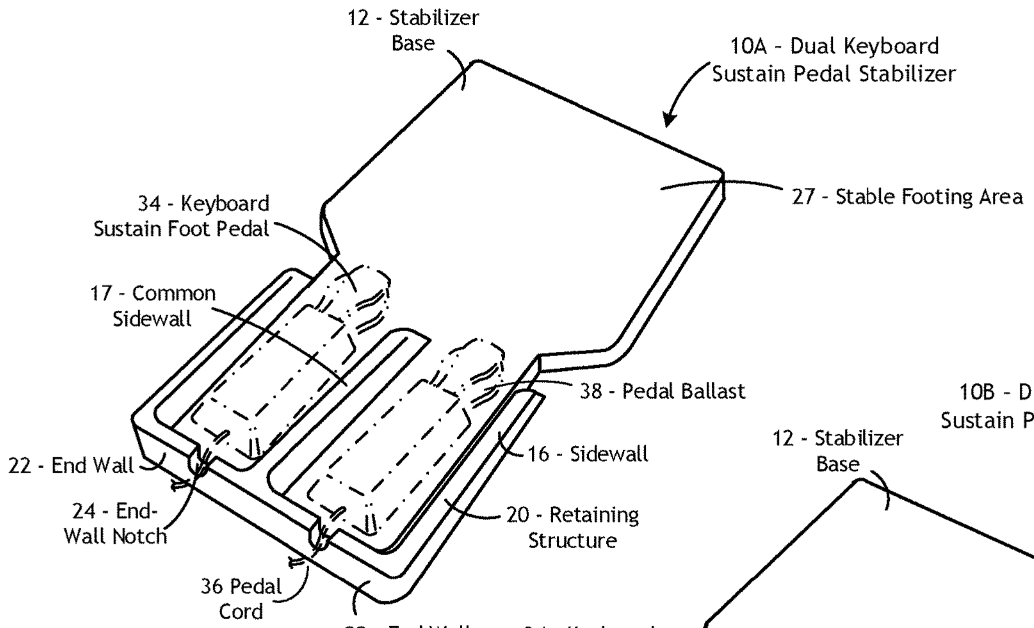
FIG. 1A depicts an assembly view of a first preferred embodiment of the dual keyboard sustain pedal stabilizer of the present invention with a pair of keyboard sustain foot pedals shown in phantom mounted within the pedal retention area of the retaining structure.

Referring now to the drawings, FIG. 1A depicts an assembly view of a first preferred embodiment of the dual keyboard sustain pedal stabilizer of the present invention [10A] mounted within the pedal retention area [13] of the retaining structure [20], with a pair of keyboard sustain foot pedals [34] shown in phantom.

The dual keyboard sustain pedal stabilizer of the present invention [10A] includes the stabilizer base [12], the retaining structure [20], and the pedal-retention area [13], and the stable footing area which are preferably made of a single piece of material. The dual keyboard sustain pedal stabilizer [10A and 10B] is preferably made of a darkened or black rigid polypropylene material, such as an oriented polyethylene terephthalate, or a simulated polypropylene material and preferably has a non-aggressive tread pattern.

The underside has a non-slip top surface, which preferably includes a plurality of rows of aligned treads. Also, the dual keyboard sustain pedal stabilizer of the present invention preferably has a non-slip underside [19B].

The pair of keyboard sustain foot pedals [34] are mounted side-by-side and retained by a sidewall [16], a common sidewall [17], and an end wall [22] of the retaining structure.

The dual keyboard sustain pedal stabilizer of the present invention [10A] is for use a pair of keyboard sustain foot pedals [34]. The dual keyboard sustain pedal stabilizer [10A] comprises a stabilizer base [12], and a pedal-retention area [13] for retaining the two keyboard sustain foot pedals [34].

The keyboard sustain foot pedals [34] are securely retained onto the dual keyboard sustain pedal stabilizer of the present invention [10A and 10B] by a retaining structure [20]. The retaining structure [20] as depicted in FIGS. 1A and 1B comprises a pair of sidewalls [16], a common sidewall [17], and an end-wall [22].

The keyboard sustain foot pedal [34] preferably includes a cord [36] for securing to a keyboard. A notch [24] is disposed in the end-wall [24] for retaining and positioning the cord [36].

Figure 1B:
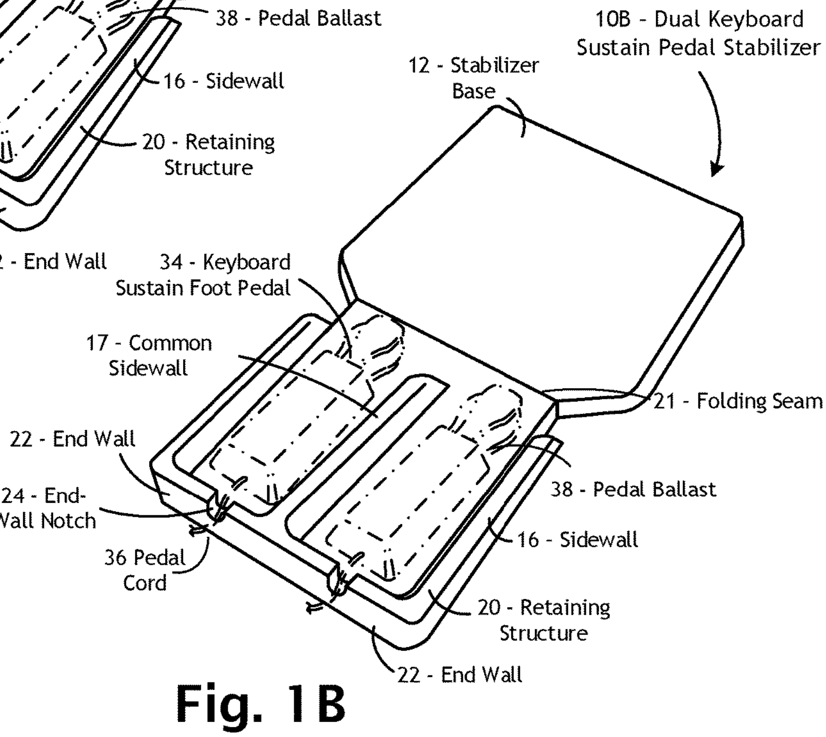
FIG. 1B depicts an assembly view of a second preferred embodiment of the dual keyboard sustain pedal stabilizer of the present invention with a pair of keyboard sustain foot pedals shown in phantom mounted within the pedal retention area of the retaining structure, the dual keyboard sustain pedal stabilizer including a folding seam enabling the stabilizer to be folded into a more compact position ready for transport.

FIG. 1B depicts an assembly view of a second preferred embodiment of the dual keyboard sustain pedal stabilizer of the present invention [10B] mounted within the pedal retention area [13] of the retaining structure [20], with a pair of keyboard sustain foot pedals [34] shown in phantom. The pair of keyboard sustain foot pedals [34] are mounted side-by-side and retained by a sidewall [16], a common sidewall [17], and an end wall [22] of the retaining structure.

This second preferred embodiment of the dual keyboard sustain foot pedal stabilizer of the present invention [10B] includes a folding seam [21] in cooperative engagement with a hinge [40] to make the device more compact and portable.

Figure 2A:
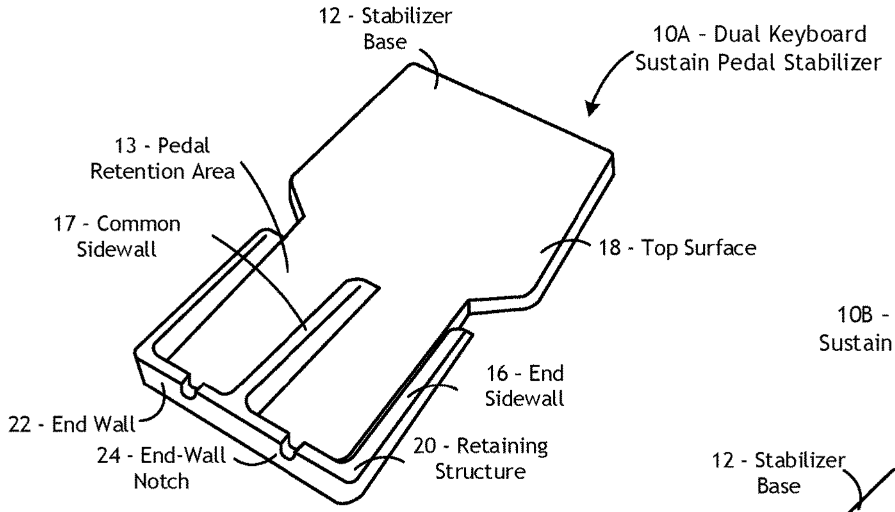
FIG. 2A depicts an assembly view of the dual keyboard sustain pedal stabilizer of FIG. 1A.
Figure 2B:
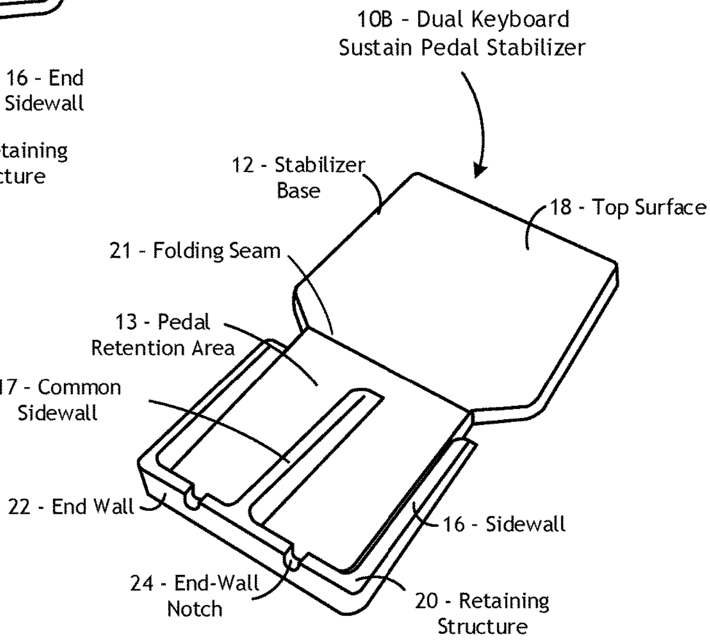
FIG. 2B depicts an assembly view of the dual keyboard sustain pedal stabilizer of FIG. 1B.
Figure 3A:
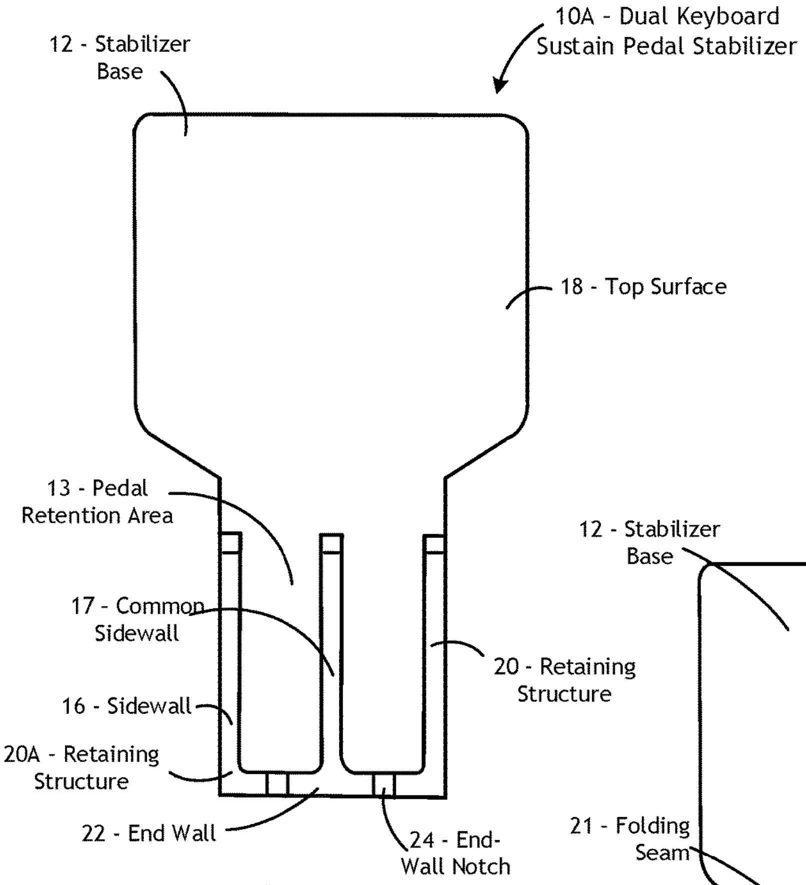
FIG. 3A depicts a top view of the dual keyboard sustain pedal stabilizer of FIG. 2A.
Figure 3B:
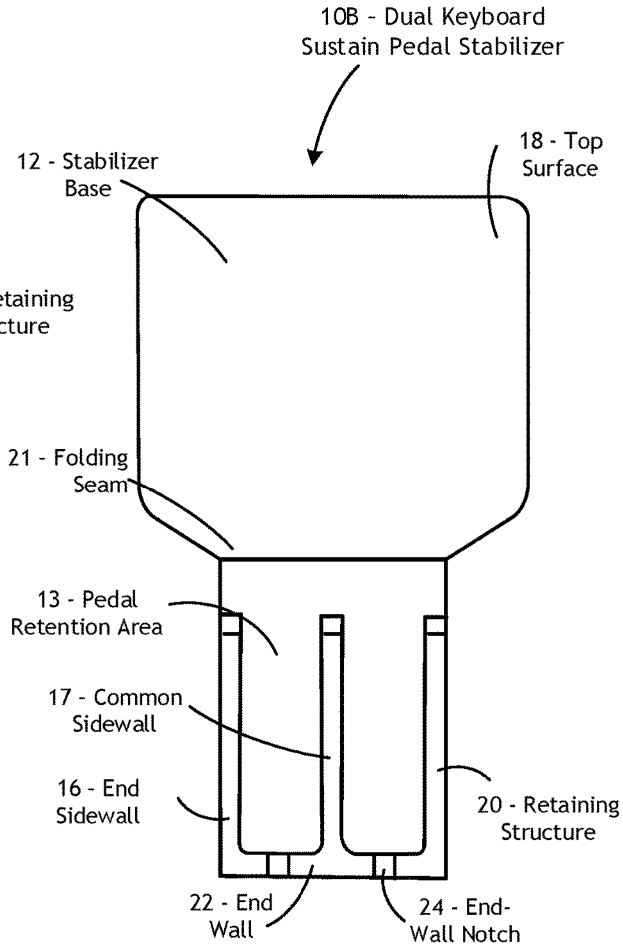
FIG. 3B depicts a top view of the dual keyboard sustain pedal stabilizer of FIG. 2B.

FIG. 2A depicts an assembly view of the dual keyboard sustain pedal stabilizer [10A], and FIG. 2B depicts an assembly view of the dual keyboard sustain pedal stabilizer [10B]. FIG. 3A depicts a top view of the dual keyboard sustain pedal stabilizer [10A], and FIG. 3B depicts a top view of the dual keyboard sustain pedal stabilizer [10B].

Figure 4A:
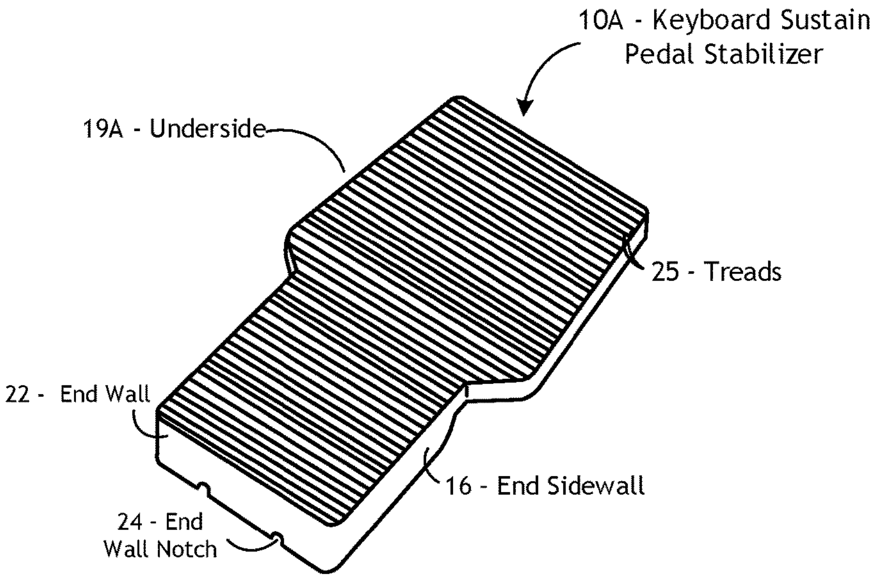
FIG. 4A depicts an assembly view of the underside of the dual keyboard sustain pedal stabilizer of FIG. 2A with a plurality of treads that form a non-slip surface, forming a high surface energy material that maintains affinity to a floor surface of a venue even in the presence of moisture on the floor surface.

FIG. 4A depicts the underside [19A] of the dual keyboard sustain foot pedal stabilizer [10A] with a plurality of treads [25] that form a non-slip surface, forming a high surface energy material that maintains affinity to a floor surface of a venue even in the presence of moisture on the floor surface.

Figure 4B:
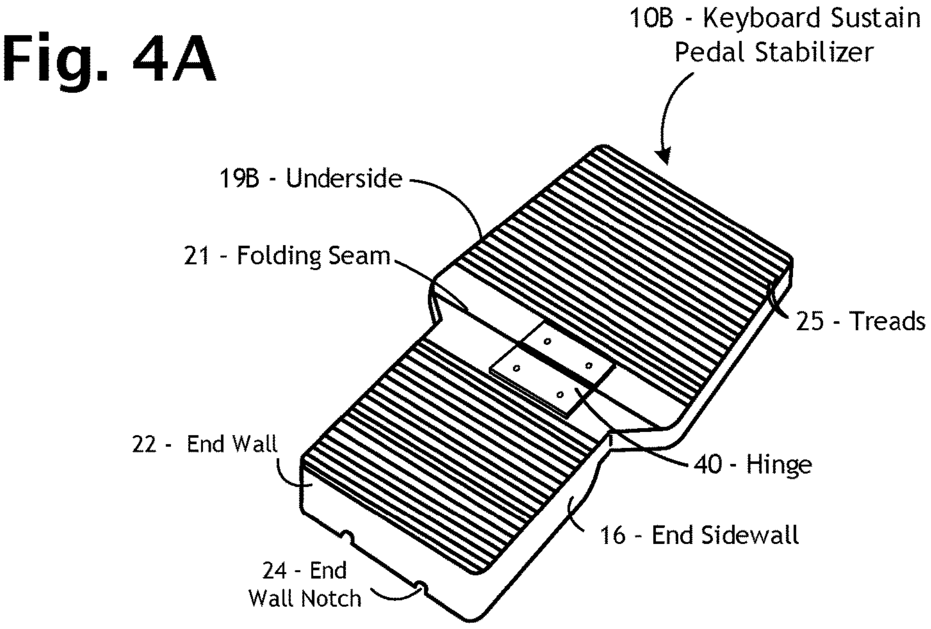
FIG. 4B depicts an assembly view of the underside of the dual keyboard sustain pedal stabilizer of FIG. 2B with a plurality of treads that form a non-slip surface, forming a high surface energy material that maintains affinity to a floor surface of a venue even in the presence of moisture on the floor surface, the dual keyboard sustain pedal stabilizer including a folding seam cooperatively engaging with a hinge enable the stabilizer to be folded into a more compact position ready for transport.

FIG. 4B depicts the underside [19B] of the dual keyboard sustain pedal stabilizer [10B] with a plurality of treads [25] that form a non-slip surface, forming a high surface energy material that maintains affinity to a floor surface of a venue even in the presence of moisture on the floor surface. The tread configuration provides the non-slip surface.

The dual keyboard sustain pedal stabilizer of the present invention [10B] is severed into a stabilizer base [12] and a pedal retention area [13] along a folding seam [21]. The hinge [40] is preferably a conventional door hinge comprising a pair of flats, and a round center section. The first flat is secured to the underside [19] of the keyboard sustain pedal stabilizer of the present invention [10B] by screw-type fasteners and aligned with the edge of the stabilizer base [12] and the second flat is secured to the edge of the pedal retention area [13].

Figure 5A:
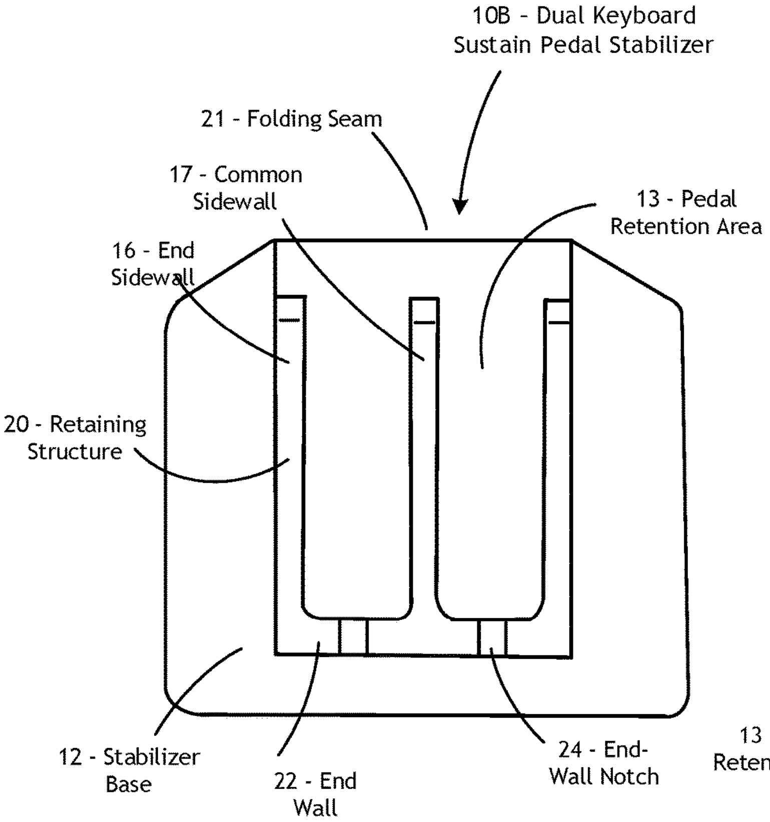
FIG. 5A is a top view of the dual keyboard sustain pedal stabilizer of FIG. 2B with treads disposed on the underside.
Figure 5B:
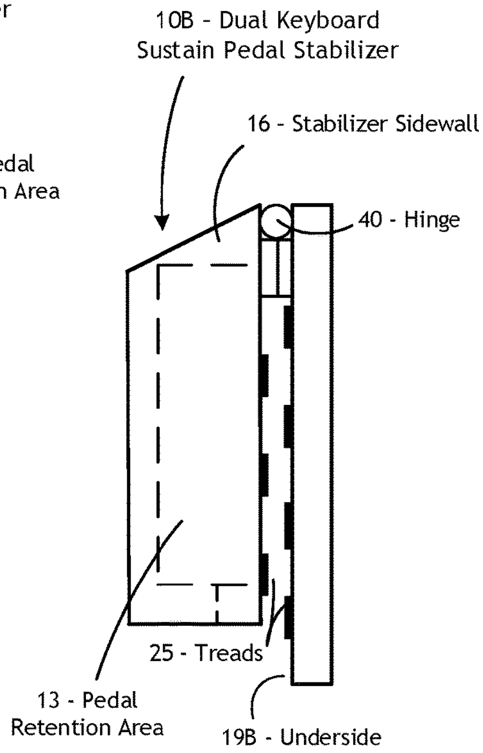
FIG. 5B is a side view of the dual keyboard sustain pedal stabilizer of FIG. 5A, the dual keyboard sustain pedal stabilizer being depicted in a folded position ready for transport.

FIG. 5A is a top view of the dual keyboard sustain pedal stabilizer [10B] with treads [25] disposed on the underside [19A]. FIG. 5B is a side view of the dual keyboard sustain pedal stabilizer [10B]. The dual keyboard sustain pedal stabilizer [10B] is depicted in a folded position ready for transport.

Figure 6A:
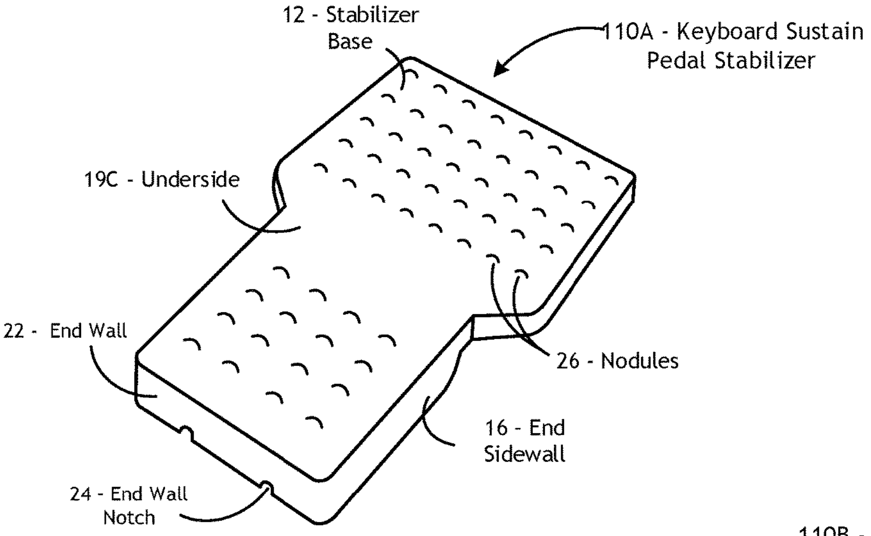
FIG. 6A depicts an assembly view of an alternate embodiment of the underside of the dual keyboard sustain pedal stabilizer of FIG. 2A with a plurality of aligned and patterned nodules that form a non-slip surface, forming a high surface energy material that maintains affinity to a floor surface of a venue even in the presence of moisture on the floor surface.

FIG. 6A depicts the underside [19C] of the dual keyboard sustain pedal stabilizer [110A] with a plurality of nodules that form a non-slip surface, forming a high surface energy material that maintains affinity to a floor surface of a venue even in the presence of moisture on the floor surface. The underside [19C] of the dual keyboard sustain pedal stabilizer of the present invention preferably has a non-slip surface which in this embodiment includes a plurality of rows of aligned nodules protruding upwardly.

Figure 6B:
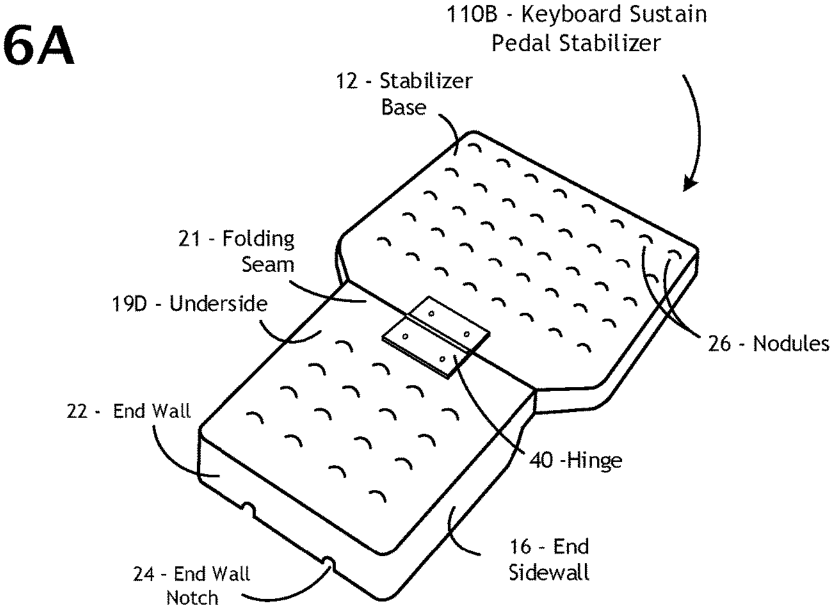
FIG. 6B depicts the underside of the dual keyboard sustain pedal stabilizer of FIG. 6A with a plurality of aligned and patterned nodules that form a non-slip surface, forming a high surface energy material that maintains affinity to a floor surface of a venue even in the presence of moisture on the floor surface, the dual keyboard sustain pedal stabilizer including a folding seam cooperatively engaging with a hinge enable the stabilizer to be folded into a more compact position ready for transport.

FIG. 6B depicts the underside [19D] of the dual keyboard sustain pedal stabilizer [110B] with a plurality of nodules that form a non-slip surface, forming a high surface energy material that maintains affinity to a floor of a venue even in the presence of moisture on the floor surface. The hinge [40] and nodule configuration is depicted in FIGS. 6B, 7A, and 7B.

Figure 7A:
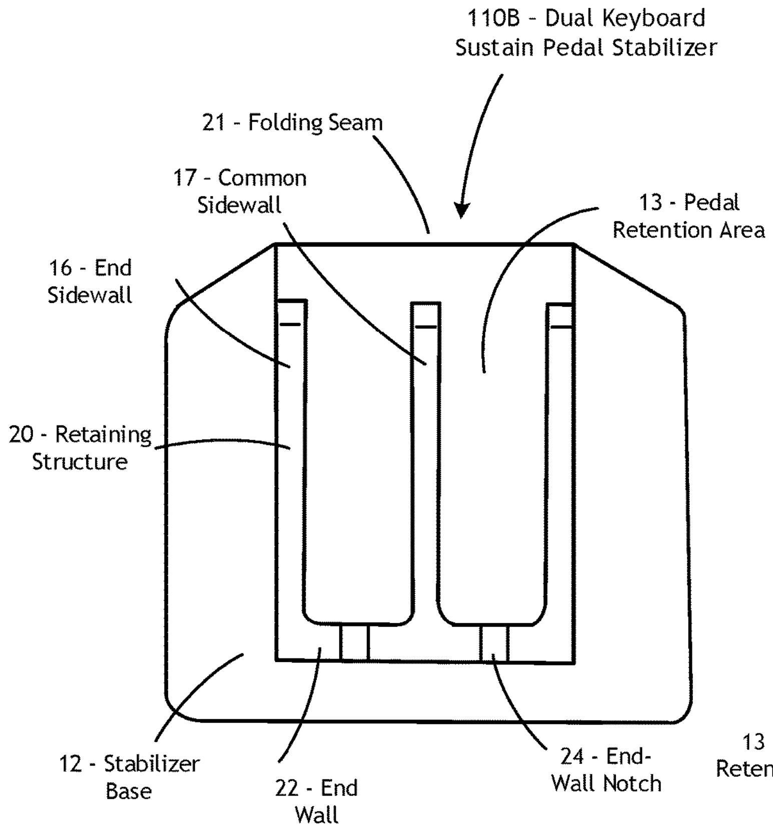
FIG. 7A is a top view of the dual keyboard sustain pedal stabilizer with the nodules disposed on the underside.
Figure 7B:
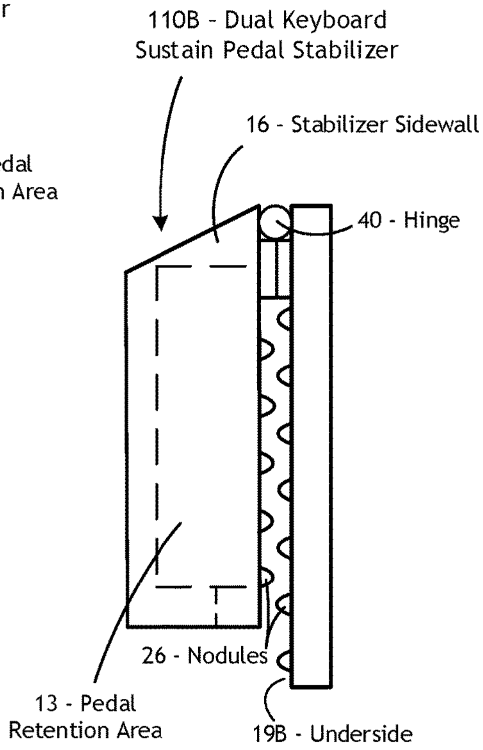
FIG. 7B is a side view of the dual keyboard sustain pedal stabilizer of FIG. 7A, the dual keyboard sustain pedal stabilizer being depicted in a folded position ready for transport.

FIG. 7A is a top view of the dual keyboard sustain pedal stabilizer [110B] with nodules [26] disposed on the underside [19B]. FIG. 7B is a side view of the dual keyboard sustain pedal stabilizer [110B]. The dual keyboard sustain pedal stabilizer [10B] is depicted in a folded position ready for transport.

Figure 8A:
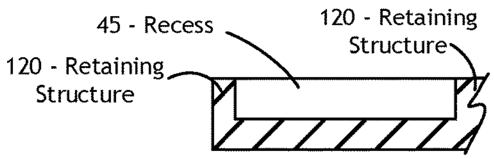
FIG. 8A depicts an assembly view of yet another preferred embodiment of the dual keyboard sustain pedal stabilizer of the present invention mounted within the pedal retention area of the retaining structure, where the pair of keyboard sustain foot pedals are mounted side-by-side and retained within a retaining structure, the retaining structure being a recess, as shown in SECTION "A-A".
Figure 8A:
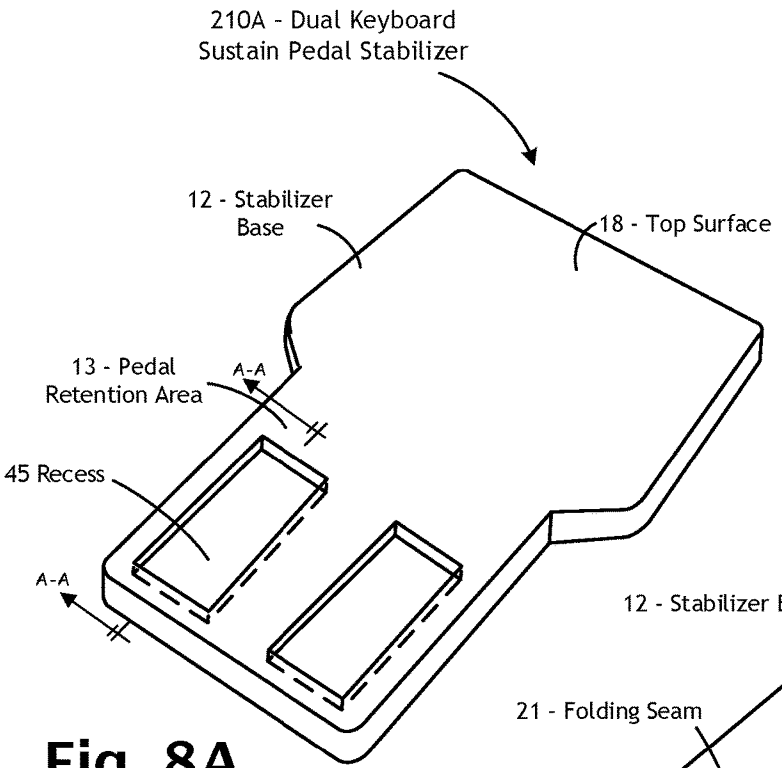

FIG. 8A depicts an assembly view of yet another preferred embodiment of the dual keyboard sustain pedal stabilizer [210A] mounted within the pedal retention area [13] of the retaining structure [20].

The retaining structure comprises a compressed area or recess [45] which is slightly larger than the keyboard sustain foot pedal [34] that is to be retained therein. The perimeter of the recess [45] forms the retaining structure for securing each keyboard sustain foot pedal [34] in place during usage. A cross section of the recess and the surrounding retaining structure [20] is shown in SECTION A-A.

Once the dimensions of the keyboard sustain foot pedal [34] are known, a press is designed that is about 0.25" wider and 0.25" longer than the length and width of the keyboard sustain foot pedal [34]. The press is then compressed into the retaining structure [20] where the keyboard sustain foot pedal [34] is to be secured. Preferably, the retaining structure [20] is compressed between 40% and 60% of its original thickness.

Figure 8B:
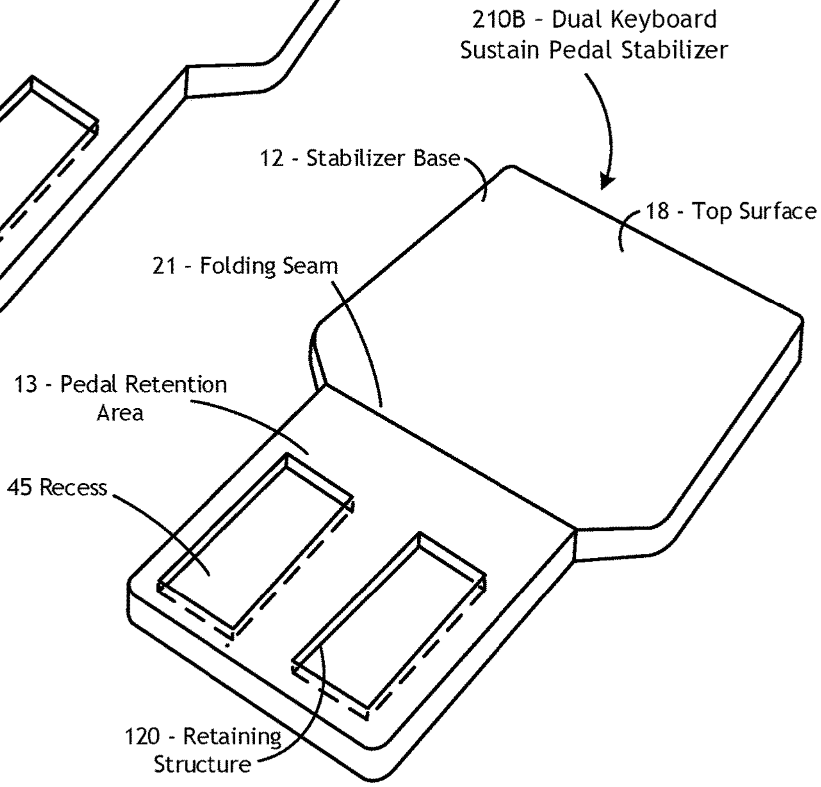
FIG. 8B depicts an assembly view of still another preferred embodiment of the dual keyboard sustain pedal stabilizer of the present invention mounted within the pedal retention area of the retaining structure, where the pair of keyboard sustain foot pedals are mounted side-by-side and retained within a retaining structure, the retaining structure being a recess, the dual keyboard sustain pedal stabilizer including a folding seam cooperatively engaging with a hinge enabling the stabilizer to be folded into a more compact position for transport.

FIG. 8B depicts an assembly view of still another preferred embodiment of the dual keyboard sustain pedal stabilizer of the present invention [210B] mounted within the pedal retention area [13] of the retaining structure [20]. The pair of keyboard sustain foot pedals [34] are mounted side-by-side and retained within a retaining structure [20]. The retaining structure is a recess [45]. The dual keyboard sustain pedal stabilizer [210B] includes a folding seam [21] and hinge [40] enabling the stabilizer [210B} to be folded into a more compact position ready for transport.

FIG. 9A depicts an assembly view of but another preferred embodiment of the dual keyboard sustain pedal stabilizer of the present invention [310A] mounted within the pedal retention area [13] of the retaining structure [20]. The pair of keyboard sustain foot pedals [34] are mounted side-by-side and retained within the retaining structure [20]. The retaining structure [20] is an aperture [46], as detailed in SECTION “B-B”.

The retaining structure [20] comprises an aperture [46] which is slightly larger than the keyboard sustain foot pedal [34] that is to be retained therein. The keyboard sustain foot pedal [34] rests upon the floor, but since the underside [19A and 19B] of the dual sustain pedal stabilizer [310A] is secured to the floor, the dual keyboard sustain pedal stabilizer [310A] is stationary. The perimeter of the aperture [46] forms the retaining structure for securing each keyboard sustain foot pedal [34] in place during usage. A cross section of the aperture [46] and the surrounding retaining structure [20] is detailed in SECTION “B-B”.

Once the dimensions of the keyboard sustain foot pedal [34] are known, a cutting device is designed to form each aperture [46] in the predetermined location of the pedal retention area [13] that is about 0.25" wider and 0.25" longer than the length and width of the keyboard sustain foot pedal [34].

FIG. 9B depicts an assembly view of but yet another preferred embodiment of the dual keyboard sustain pedal stabilizer of the present invention [310B] mounted within the pedal retention area [13] of the retaining structure [20], where the pair of keyboard sustain foot pedals [34] are mounted side-by-side and retained within a retaining structure [20]. The retaining structure is an aperture [46]. The dual keyboard sustain pedal stabilizer [310B] includes a folding seam [21] and hinge [40] enabling the stabilizer [310B] to be folded into a more compact position ready for transport.

Figure 10A:
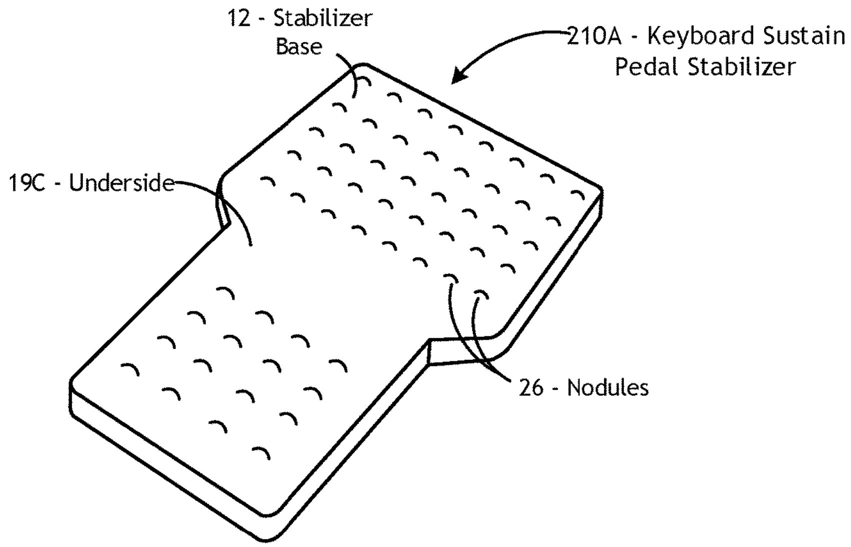
FIG. 10A depicts an assembly view of the underside of the dual keyboard sustain pedal stabilizer of FIG. 8A with a plurality of nodules that form a non-slip surface, forming a high surface energy material that maintains affinity to a floor surface of a venue even in the presence of moisture on the floor surface.

FIG. 10A depicts an assembly view of the underside of the dual keyboard sustain pedal stabilizer [210A] of FIG. 8A with a plurality of nodules [26] that form a non-slip surface, forming a high surface energy material that maintains affinity to a floor surface of a venue even in the presence of moisture on the floor surface.

Figure 10B:
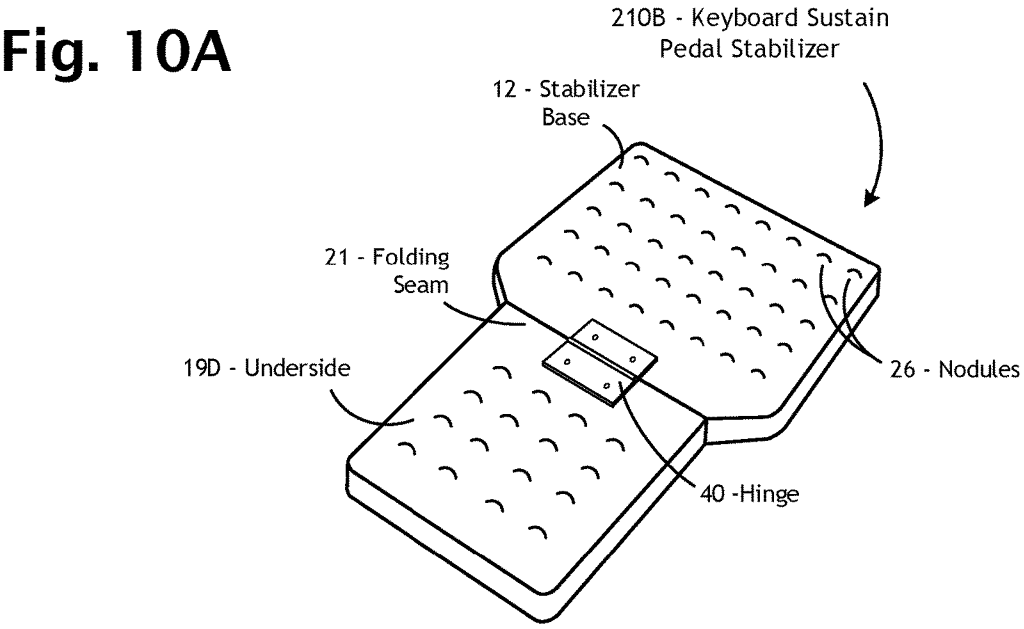
FIG. 10B depicts an assembly view of the underside of the dual keyboard sustain pedal stabilizer of FIG. 8B with a plurality of nodules that form a non-slip surface, forming a high surface energy material that maintains affinity to a floor surface of a venue even in the presence of moisture on the floor surface, the dual keyboard sustain pedal stabilizer including a folding seam cooperatively engaging with a hinge enable the stabilizer to be folded into a more compact position ready for transport.

FIG. 10B depicts an assembly view of the underside of the dual keyboard sustain pedal stabilizer [210B] of FIG. 8B with a plurality of nodules [26] that form a non-slip surface, forming a high surface energy material that maintains affinity to a floor surface of a venue even in the presence of moisture on the floor surface, the dual keyboard sustain pedal stabilizer [210B] including a folding seam [21] in cooperative engagement with a hinge [40], the stabilizer to be folded into a more compact position ready for transport.

Figure 11A:
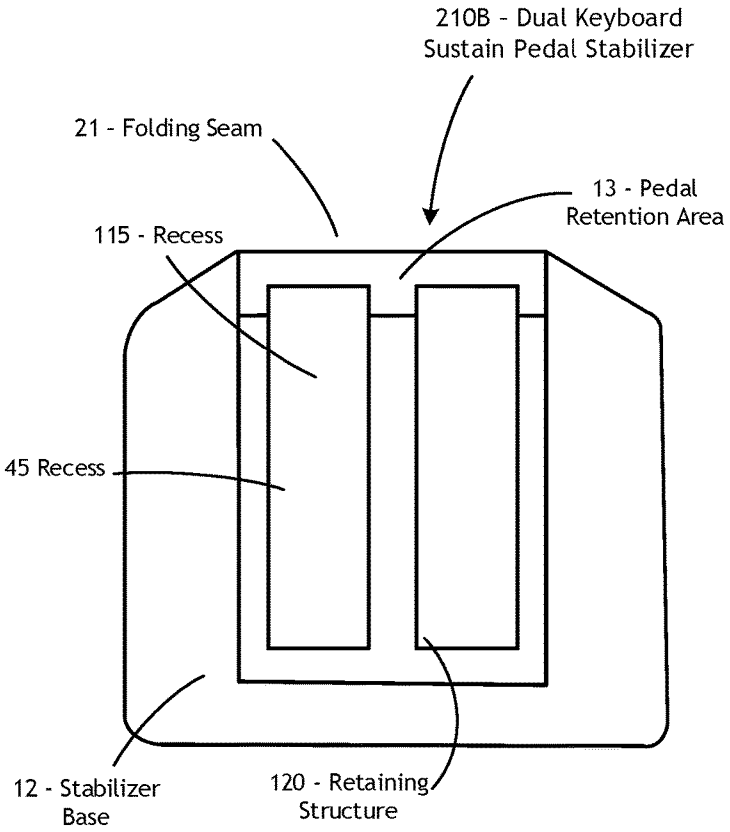
FIG. 11A is a top view of the dual keyboard sustain pedal stabilizer of FIG. 8B.
Figure 11B:
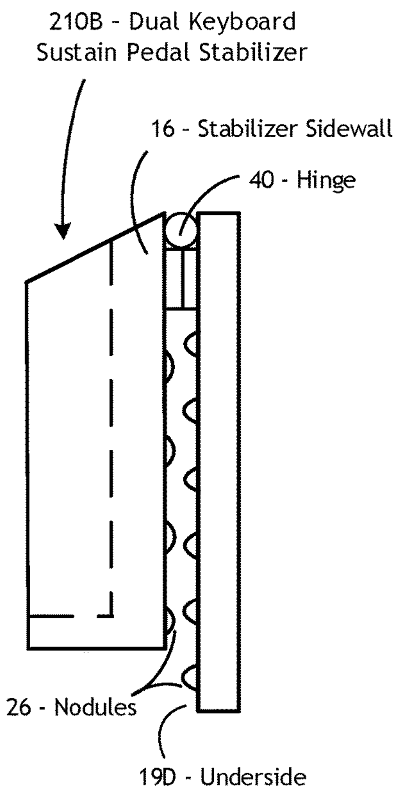
FIG. 11B is a side view of the dual keyboard sustain pedal stabilizer of FIG. 8B, the keyboard sustain pedal stabilizer being in a folded position ready for transport.

FIG. 11A is a top view of the dual keyboard sustain pedal stabilizer [410B], and FIG. 11B is a side view of the dual keyboard sustain pedal stabilizer [410B]. The keyboard sustain pedal stabilizer [410B] is in a folded position ready for transport.

Figure 12A:
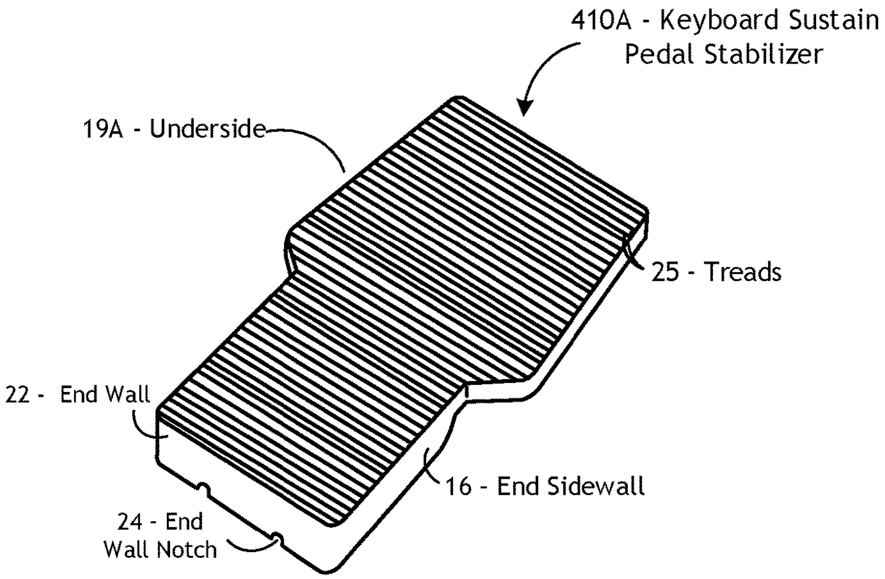
FIG. 12A depicts the underside of the dual keyboard sustain pedal stabilizer of FIG. 8B with a plurality of treads that form a non-slip surface, forming a high surface energy material that maintains affinity to a floor surface of a venue even in the presence of moisture on the floor surface.

FIG. 12A depicts the underside of the dual keyboard sustain pedal stabilizer [410B] with a plurality of treads [25] that form a non-slip surface, forming a high surface energy material that maintains affinity to a floor surface of a venue even in the presence of moisture on the floor surface.

Figure 12B:
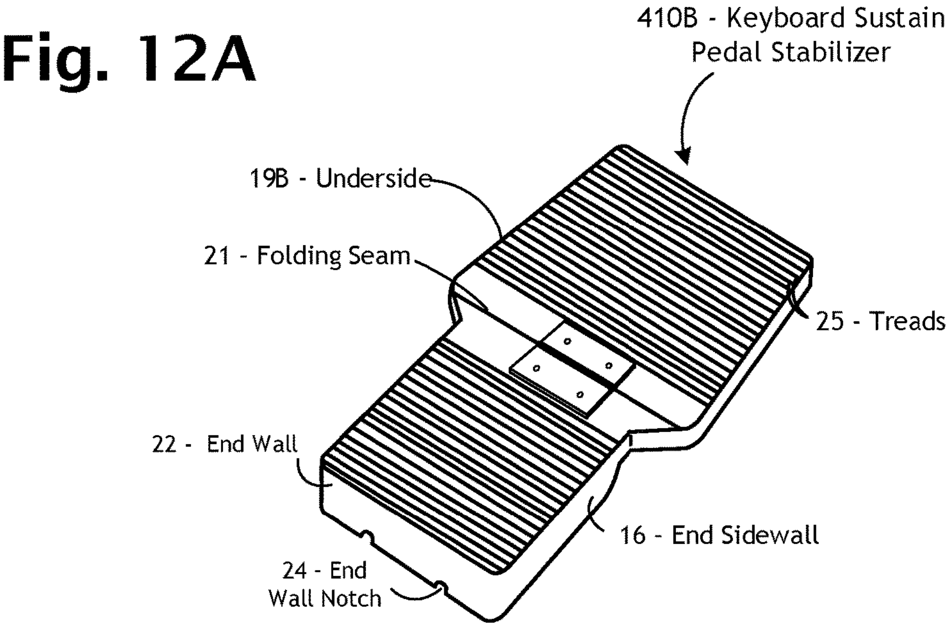
FIG. 12B depicts the underside of the dual keyboard sustain pedal stabilizer of FIG. 8B with a plurality of treads that form a non-slip surface, forming a high surface energy material that maintains affinity to a floor surface of a venue even in the presence of moisture on the floor surface, the dual keyboard sustain pedal stabilizer including a folding seam cooperatively engaging with a hinge enable the stabilizer to be folded into a more compact position ready for transport.

FIG. 12B depicts the underside of the dual keyboard sustain pedal stabilizer [410B] with a plurality of treads [25] that form a non-slip surface, forming a high surface energy material that maintains affinity to a floor surface of a venue even in the presence of moisture on the floor surface, the dual keyboard sustain pedal stabilizer [410B] including a folding seam [21] in cooperative engagement with a hinge [40] that enable the stabilizer to be folded into a more compact position ready for transport.

Figure 13A:
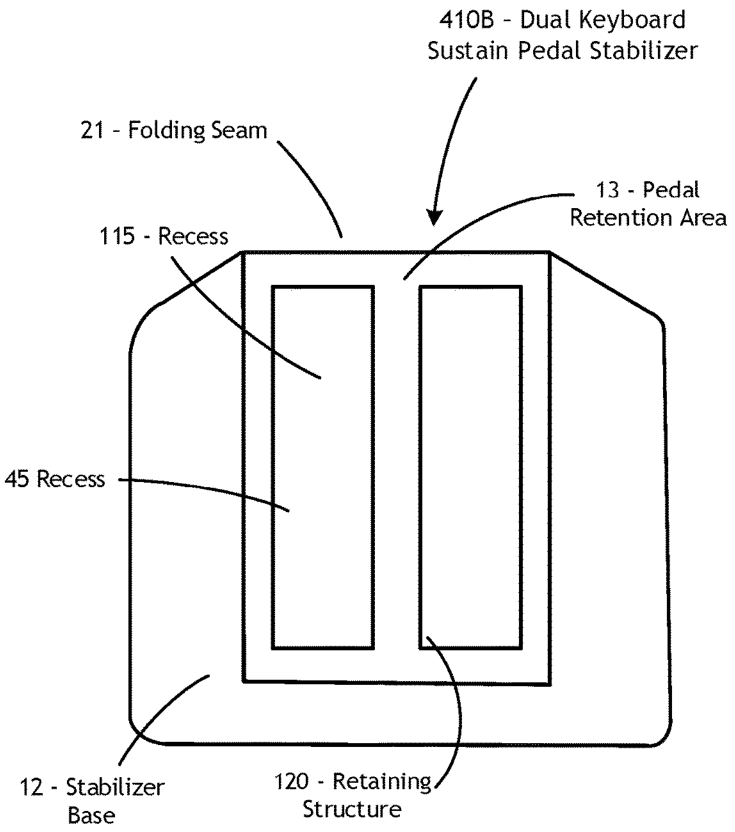
FIG. 13A depicts the underside of the dual keyboard sustain pedal stabilizer of FIG. 8A with a plurality of treads that form a non-slip surface, forming a high surface energy material that maintains affinity to a floor surface of a venue even in the presence of moisture on the floor surface.

FIG. 13A depicts the underside of the dual keyboard sustain pedal stabilizer [410A] with a plurality of treads [25] that form a non-slip surface, forming a high surface energy material that maintains affinity to a floor surface of a venue even in the presence of moisture on the floor surface.

Figure 13B:
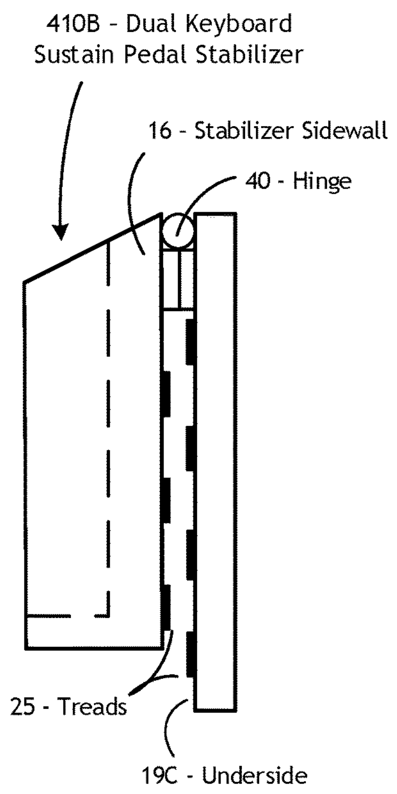
FIG. 13B depicts the underside of the dual keyboard sustain pedal stabilizer of FIG. 8B with a plurality of treads that form a non-slip surface, forming a high surface energy material that maintains affinity to a floor surface of a venue even in the presence of moisture on the floor surface.

FIG. 13B depicts the underside of the dual keyboard sustain pedal stabilizer [410B] with a plurality of treads [25] that form a non-slip surface, forming a high surface energy material that maintains affinity to a floor surface of a venue even in the presence of moisture on the floor surface.

Figure 14A:
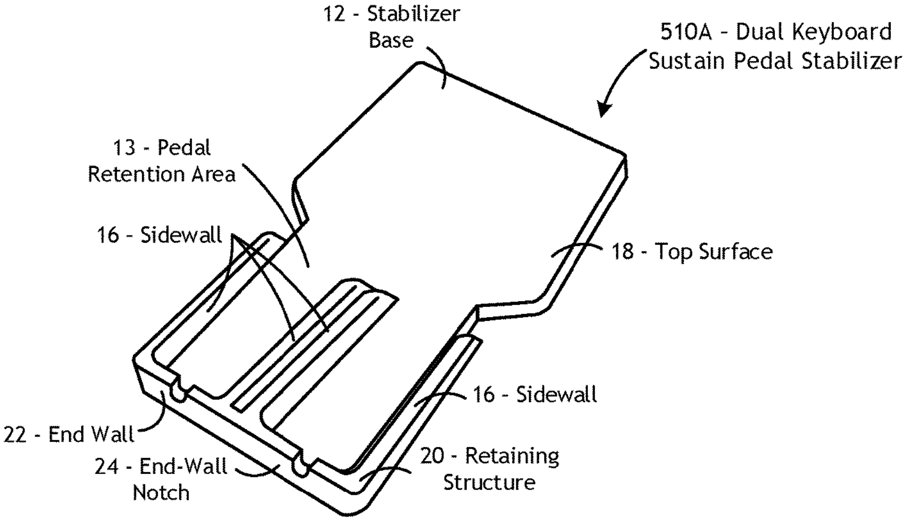
FIG. 14A depicts an assembly view of still yet another preferred embodiment of the dual keyboard sustain pedal stabilizer mounted within the pedal retention area of the retaining structure, where each keyboard sustain foot pedal being mounted side-by-side and retained between a pair of sidewalls and an end wall.

FIG. 14A depicts an assembly view of still yet another preferred embodiment of the dual keyboard sustain pedal stabilizer [510A] mounted within the pedal retention area of the retaining structure, where each keyboard sustain foot pedal [34] being mounted side-by-side and retained between a pair of sidewalls [16] and an end wall [22].

Figure 14B:
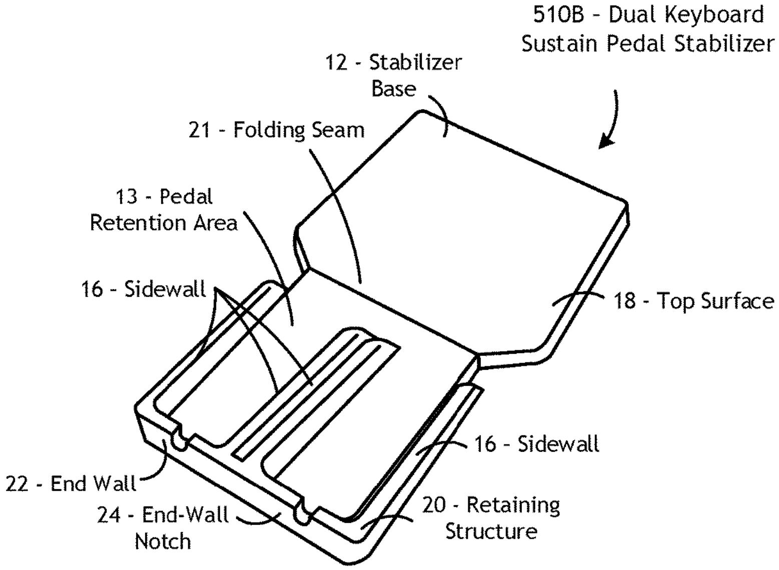
FIG. 14B depicts an assembly view of still yet another preferred embodiment of the dual keyboard sustain pedal stabilizer mounted within the pedal retention area of the retaining structure of 13A, where each keyboard sustain foot pedal is mounted side-by-side and retained between a pair of sidewalls and an end wall, the dual keyboard sustain pedal stabilizer having a folding seam and hinge to make the device more compact and portable.

FIG. 14B depicts an assembly view of still yet another preferred embodiment of the dual keyboard sustain pedal stabilizer [510B] mounted within the pedal retention area of the retaining structure of 13A, where each keyboard sustain foot pedal [34] is mounted side-by-side and retained between a pair of sidewalls [16] and an end wall [22], the dual keyboard sustain pedal stabilizer having a folding seam [21] in cooperative engagement with a hinge [40] to make the device more portable.

Figure 15A:
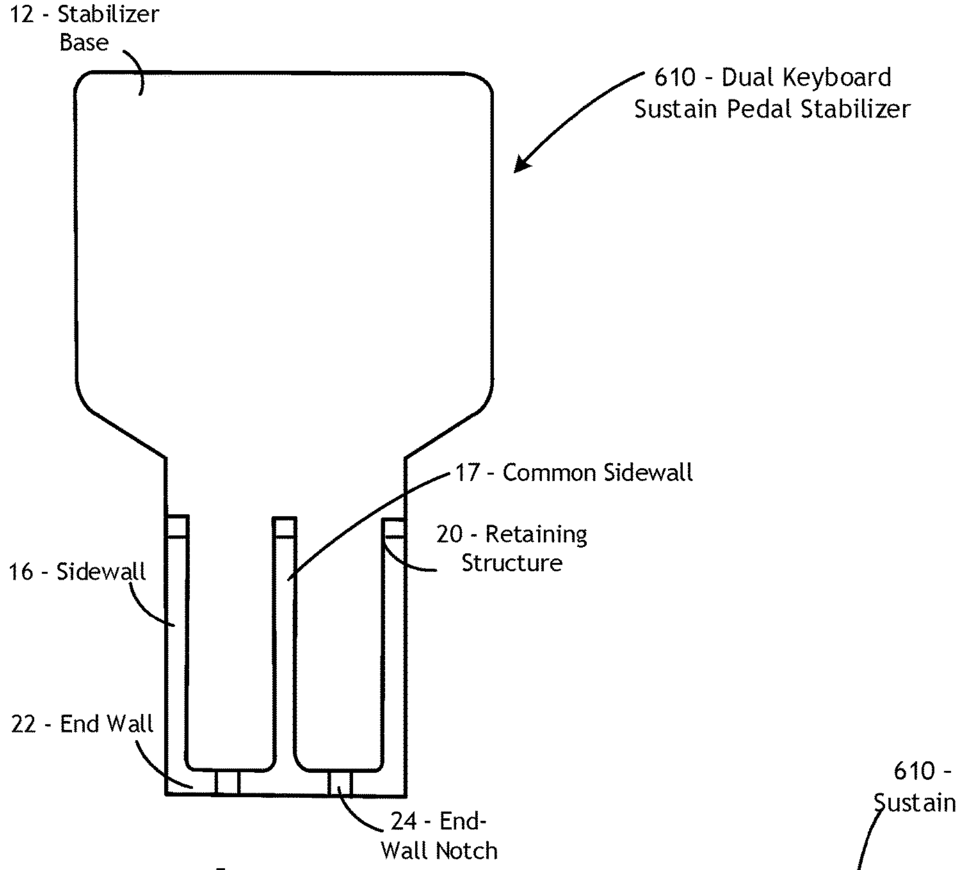
FIG. 15A depicts a top view of but, yet another preferred embodiment of the dual keyboard sustain pedal stabilizer of the present invention, the dual keyboard sustain pedal stabilizer being in the expanded state, the stabilizer base being made of a flexible material that enables a roll up for packaging and transporting the device.
Figure 15B:
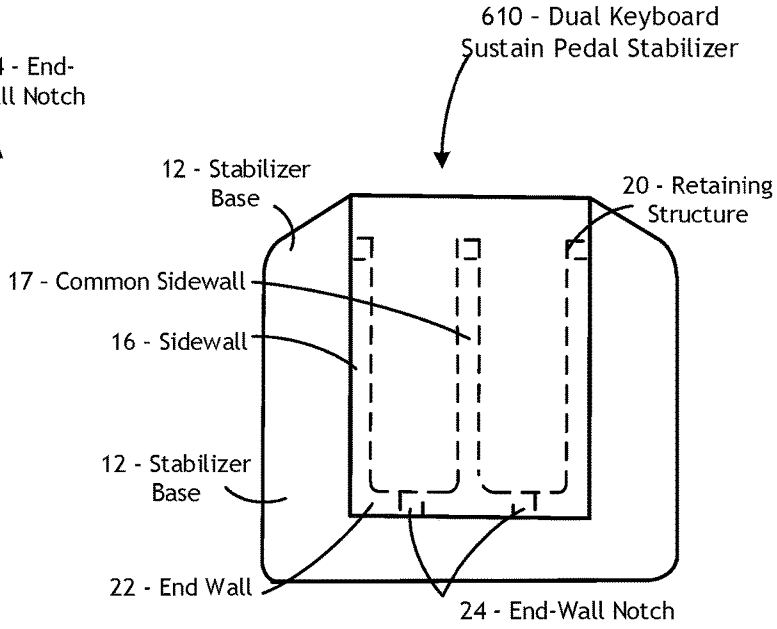
FIG. 15B depicts a top view of the dual keyboard sustain pedal stabilizer of FIG. 15A, the dual keyboard sustain foot pedal being in the contracted position ready for storage.
Figure 16:
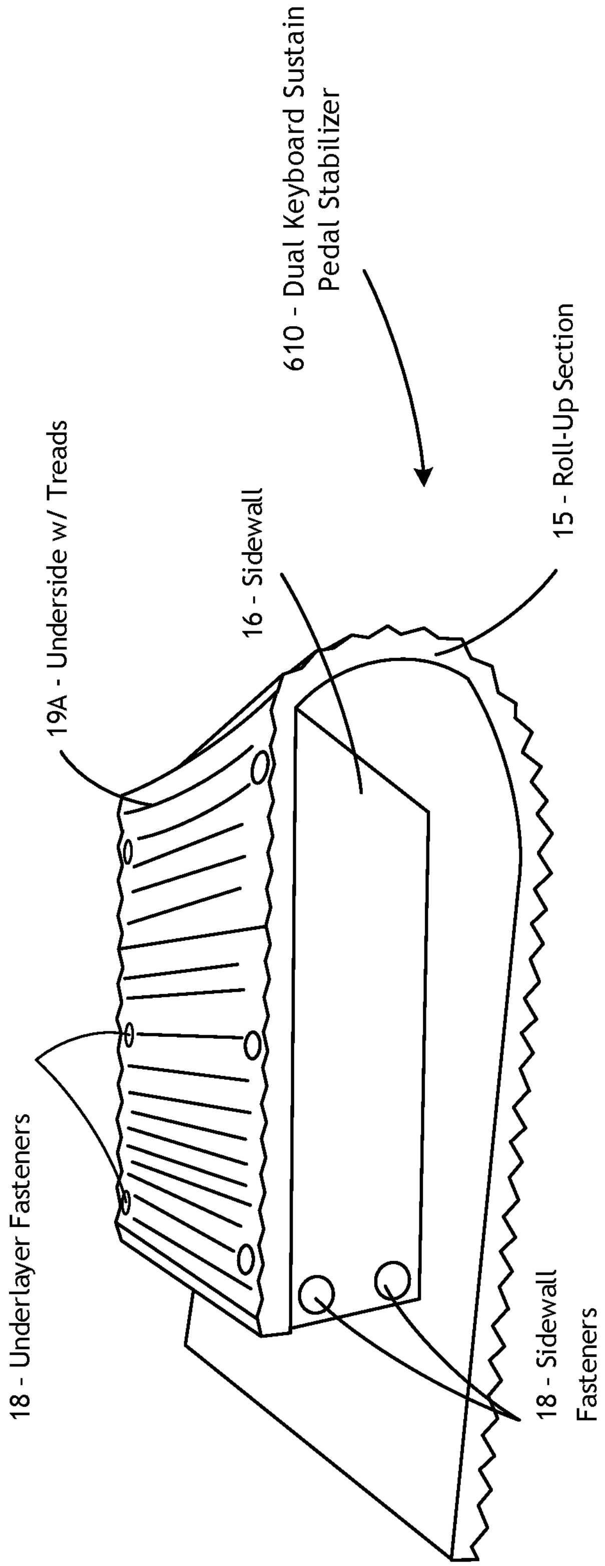
FIG. 16 depicts an end view of the dual keyboard sustain pedal stabilizer of FIG. 15B, the underside of the dual keyboard sustain pedal stabilizer having a plurality of treads that form a non-slip surface.

FIG. 15A depicts a top view of but, yet another preferred embodiment of the dual sustain pedal stabilizer of the present invention [610]. The dual keyboard sustain pedal stabilizer [610] is in the expanded state. The stabilizer base [12] is made of a flexible material that enables a roll up for packaging and transporting the dual keyboard sustain foot pedal of the present invention [610] in a conventional carrying case or bag. FIG. 15B depicts a top view of the dual keyboard sustain pedal stabilizer [510] in the contracted position ready for storage. FIG. 16 depicts an end view of the dual keyboard sustain pedal stabilizer [610]. A pair of conventional fasteners [14] on each sidewall [16] retain each sidewall [16] to the end wall [22]. A plurality of underlayer fasteners [18] secure the underlayer to each sidewall [16]. The underside of the dual keyboard sustain pedal stabilizer [610] includes a plurality of treads [19A] that form a non-slip surface. A plurality of aligned nodes can also form the non-slip surface. Preferably, the portion of the dual sustain pedal stabilizer [610] that bends for the roll-up [15] is one-quarter of a one-sixteenth of an inch tolerance. A version of this roll-up dual keyboard sustain foot pedal can also be adapted for use with a single keyboard sustain foot pedal.

As used herein, non-slip means any suitable forms, such as cross-hatching, or a series of closely spaced nubs which extend over the underside of the dual keyboard sustain pedal stabilizer of the present invention [10A], or other indentations such as swirls which provide an anti-slip surface across the underside [19A] of the keyboard sustain pedal stabilizer of the present invention [10], which form a textured surface that is adapted to provide a secure engagement with the floor.

Throughout this application, various patents and applications are referenced by number and inventor. The disclosures of these documents in their entireties are hereby incorporated by reference into this specification in order to more fully describe the state of the art to which this invention pertains.

It is evident that many alternatives, modifications, and variations of the dual keyboard sustain pedal stabilizer of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST

10A. Dual Keyboard Sustain Pedal Stabilizer—An Embodiment
10B. Dual Keyboard Sustain Pedal Stabilizer—Another Embodiment
12. Stabilizer Base
13. Pedal Retention Area
14. Sidewall Fastener
15. Roll-Up Section
16. End Sidewall
17. Common Sidewall
18. Underlayer Fastener
19A. Underside w/Treads
19B. Underside w/Treads and Hinge
19C. Underside w/Nodules
19D. Underside w/Nodules and Hinge
20. Retaining Structure
21. Folding Seam
22. Stabilizer End-Wall
24. End-Wall Notch
25. Tread
26. Nodule
27. Stable Footing Area
34. Keyboard Sustain Foot Pedal
36. Pedal Cord
38. Pedal Ballast
40. Hinge
45. Recess
46. Aperture
110A. Dual Keyboard Sustain Pedal Stabilizer—Another Embodiment
110B. Dual Keyboard Sustain Pedal Stabilizer—Another Embodiment
113. Pedal Retention Area
120. Retaining Structure
210A. Dual Keyboard Sustain Pedal Stabilizer—Another Embodiment
210B. Dual Keyboard Sustain Pedal Stabilizer—Another Embodiment
310A. Dual Keyboard Sustain Pedal Stabilizer—Another Embodiment
310B. Dual Keyboard Sustain Pedal Stabilizer—Another Embodiment
410A. Dual Keyboard Sustain Pedal Stabilizer—Another Embodiment
410B. Dual Keyboard Sustain Pedal Stabilizer—Another Embodiment
510A. Dual Keyboard Sustain Pedal Stabilizer—Another Embodiment
510B. Dual Keyboard Sustain Pedal Stabilizer—Another Embodiment
610. Dual Keyboard Sustain Pedal Stabilizer—Another Embodiment

The invention claimed is:

1. A dual keyboard sustain pedal stabilizer for use with a first keyboard sustain foot pedal and a second keyboard sustain foot pedal, said dual keyboard sustain pedal stabilizer comprises:

a stabilizer base including a stable footing area;

a first pedal-retention area in cooperative engagement with said stabilizer base, said first pedal-retention area including a first retaining structure proximate to said stabilizer base, said first retaining structure for securing said first keyboard sustain foot pedal in place within said first pedal-retention area of said dual keyboard sustain pedal stabilizer;

a second pedal-retention area in cooperative engagement with said stabilizer base, said second pedal-retention area including a second retaining structure proximate said stabilizer base, said second retaining structure for securing said second keyboard sustain foot pedal in place within said second pedal-retention area of said dual keyboard sustain pedal stabilizer; and an underside of said stabilizer base having a non-slip surface.

2. The dual keyboard sustain pedal stabilizer of claim 1, further comprising a hinge affixing said stabilizer base to said first and said second pedal-retention area, said hinge enabling rotation between said stabilizer base and said first and said second pedal-retention area.

3. The dual keyboard sustain pedal stabilizer of claim 1, whereby said stabilizer base, said first and said second retaining structure, and said pedal-retention area are made of a single piece of material.

4. The dual keyboard sustain pedal stabilizer of claim 1, whereby said first retaining structure includes a first recess, a first perimeter of said first recess forming said first retaining structure for securing said first keyboard sustain foot pedal in place.

5. The dual keyboard sustain pedal stabilizer of claim 1, whereby said first retaining structure includes a first aperture, a first perimeter of said first aperture forming said first retaining structure for securing said first keyboard sustain foot pedal in place, said dual keyboard sustain pedal stabilizer for placement on a floor of a venue, said first keyboard sustain foot pedal for placement upon said floor of said venue within said first aperture of said dual keyboard sustain pedal stabilizer.

6. The dual keyboard sustain pedal stabilizer of claim 1, wherein said first pedal-retention area is proximate to said stable footing area and said second pedal-retention area is proximate to said stable footing area.

7. The dual keyboard sustain pedal stabilizer of claim 1, whereby said first retaining structure is a common sidewall sandwiched between a pair of end sidewalls, and an end wall, said end wall being essentially normal to said end sidewalls.

8. The dual keyboard sustain pedal stabilizer of claim 1, wherein said underside includes a plurality of nodules protruding therefrom.

9. The dual keyboard sustain pedal stabilizer of claim 1, wherein said underside includes a plurality of treads to form said non-slip surface.

10. A dual keyboard sustain pedal stabilizer for use with a first keyboard sustain foot pedal and a second keyboard sustain foot pedal, said dual keyboard sustain pedal stabilizer comprises:

a stabilizer base;

a first pedal-retention area in cooperative engagement with said stabilizer base, said first pedal-retention area including a first and second side walls and a first end wall, said first and second side walls abutting said first pedal-retention area, said first end-wall abutting said first pedal-retention area, said first and second end sidewalls and said first end wall enabling secure retention of said first keyboard sustain foot pedal within said first pedal retention area;

a second pedal-retention area in cooperative engagement with said stabilizer base, said second pedal-retention area including a third and fourth end sidewalls, said third and fourth end sidewalls abutting said second pedal-retention area, said second end-wall abutting said second pedal-retention area, said third and fourth end sidewalls enabling secure retention of said second keyboard sustain foot pedal within said second pedal retention area; and an underside of said stabilizer base having a non-slip surface.

11. The dual keyboard sustain pedal stabilizer of claim 10, further comprising a hinge affixing said stabilizer base to said first pedal-retention area and said second pedal-retention area, said hinge enabling rotation between said stabilizer base and said first and said second pedal-retention area.

12. The dual keyboard sustain pedal stabilizer of claim 10, whereby said stabilizer base, said first and said second retaining structure, and said pedal-retention area are made of a single piece of material.

13. The dual keyboard sustain pedal stabilizer of claim 10, wherein said underside includes a plurality of nodules protruding therefrom.

14. The dual keyboard sustain pedal stabilizer of claim 10, further comprising an underside, said underside having a plurality of treads to form said non-slip surface.

15. The dual keyboard sustain pedal stabilizer of claim 11, whereby said first retaining structure is a common sidewall sandwiched between a pair of sidewalls.

16. The dual keyboard sustain pedal stabilizer of claim 10, wherein said first pedal-retention area is proximate to said stable footing area and said second pedal-retention area is proximate to said stable footing area.

17. A dual keyboard sustain pedal stabilizer for use with a first keyboard sustain foot pedal and a second keyboard sustain foot pedal, said keyboard sustain pedal stabilizer comprises:

a stabilizer base including a stable footing area;

a first pedal-retention area in cooperative engagement with said stabilizer base, said first pedal-retention area including a first retaining structure, said first retaining structure including a first recess, a first perimeter of said first recess forming said first retaining structure for securing said first keyboard sustain foot pedal in place within said dual keyboard sustain pedal stabilizer;

a second pedal-retention area in cooperative engagement relative to said stabilizer base, said second pedal-retention area including a second retaining structure, said second including a second recess, a second perimeter of said second recess forming said second retaining structure for securing said second keyboard sustain foot pedal in place within said dual keyboard sustain pedal stabilizer; and an underside of said stabilizer base having a non-slip surface.

18. The dual keyboard sustain pedal stabilizer of claim 17, further comprising a hinge affixing said stabilizer base to said first pedal-retention area and said second pedal-retention area, said hinge enabling rotation between said stabilizer base and said first and said second pedal-retention area.

19. The dual keyboard sustain pedal stabilizer of claim 17, whereby said stabilizer base, said first and said second retaining structure, and said pedal-retention area are made of a single piece of material.

20. The dual keyboard sustain pedal stabilizer of claim 17, wherein said underside includes a plurality of nodules.

21. The dual keyboard sustain pedal stabilizer of claim 17, wherein said underside has a plurality of treads.

22. The dual keyboard sustain pedal stabilizer of claim 20, further comprising a hinge affixing said stabilizer base to said first pedal-retention area and said second pedal-retention area, said hinge enabling rotation between said stabilizer base and said first and said second pedal-retention area.

23. A dual keyboard sustain pedal stabilizer for use with a first keyboard sustain foot pedal and a second keyboard sustain foot pedal, said dual keyboard sustain pedal stabilizer comprises:

a stabilizer base including a stable footing area;

a first pedal-retention area in cooperative engagement with said stabilizer base, said first pedal-retention area being proximate to said stable footing area, said first pedal-retention area including a first aperture, a first perimeter of said first aperture forming said first retaining structure for securing said first keyboard sustain foot pedal in place, said first keyboard sustain foot pedal for placement on a floor in a venue within said first aperture of said dual keyboard sustain pedal stabilizer;

a second pedal-retention area in cooperative engagement with said stabilizer base, said second pedal-retention area being proximate to said stable footing area, said second pedal-retention area including a second aperture, a second perimeter of said second aperture forming a second retaining structure for securing said second keyboard sustain foot pedal in place, said second keyboard sustain foot pedal for placement on said floor in said venue within said second aperture of said dual keyboard sustain pedal stabilizer; and an underside of said stabilizer base having a non-slip surface.

* * * * *